US010786781B2

(12) United States Patent
Nagano et al.

(10) Patent No.: US 10,786,781 B2
(45) Date of Patent: Sep. 29, 2020

(54) CARBON DIOXIDE SEPARATION AND CAPTURE APPARATUS AND METHOD OF CONTROLLING OPERATION OF CARBON DIOXIDE SEPARATION AND CAPTURE APPARATUS

(71) Applicant: Kabushiki Kaisha Toshiba, Minato-ku (JP)

(72) Inventors: Keita Nagano, Kawasaki (JP); Mitsuru Udatsu, Kawasaki (JP); Masatoshi Hodotsuka, Saitama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 491 days.

(21) Appl. No.: 15/387,001

(22) Filed: Dec. 21, 2016

(65) Prior Publication Data
US 2017/0173522 A1 Jun. 22, 2017

(30) Foreign Application Priority Data

Dec. 21, 2015 (JP) .................................. 2015-248878

(51) Int. Cl.
*B01D 53/14* (2006.01)
*B01D 53/34* (2006.01)
(Continued)

(52) U.S. Cl.
CPC ....... *B01D 53/346* (2013.01); *B01D 53/1412* (2013.01); *B01D 53/1475* (2013.01);
(Continued)

(58) Field of Classification Search
CPC ........ B01D 2252/103; B01D 2252/202; B01D 2252/20405; B01D 2252/20421;
(Continued)

(56) References Cited

U.S. PATENT DOCUMENTS 4,491,566 A 1/1985 Adams et al.
2012/0161071 A1* 6/2012 Murai ................ B01D 53/1493
252/189
(Continued)

FOREIGN PATENT DOCUMENTS

JP 2011-529 A 1/2011
JP 2012-236170 A 12/2012
(Continued)

OTHER PUBLICATIONS

Australian Office Action dated Oct. 4, 2017 in Patent Application No. 2016266040.

*Primary Examiner* — Cabrena Holecek

(74) *Attorney, Agent, or Firm* — Oblon, McClelland, Maier & Neustadt, L.L.P.

(57) ABSTRACT

A carbon dioxide separation and capture apparatus includes an absorption tower configured to cause an absorbing liquid to absorb a carbon dioxide gas contained in a process gas and a regeneration tower configured to cause the absorbing liquid from the absorption tower to release the carbon dioxide gas. The carbon dioxide separation and capture apparatus further includes an inlet concentration meter configured to measure concentration of an acid component in the process gas supplied to the absorption tower and an outlet concentration meter configured to measure concentration of the acid component in the process gas discharged from the absorption tower. Also included in the carbon dioxide separation and capture apparatus are a supplementary absorbing liquid supply mechanism configured to supply a supplementary absorbing liquid to the main unit and a controller configured to control an amount of the supplementary absorbing liquid supplied to the main unit by the supplementary absorbing liquid supply mechanism based on (Continued)

the concentrations of the acid component measured at the inlet concentration meter and the outlet concentration meter.

10 Claims, 2 Drawing Sheets

(51) Int. Cl.
  *B01D 53/62* (2006.01)
  *B01D 53/78* (2006.01)
(52) U.S. Cl.
  CPC .............. *B01D 53/62* (2013.01); *B01D 53/78* (2013.01); *B01D 2252/103* (2013.01); *B01D 2252/202* (2013.01); *B01D 2252/20405* (2013.01); *B01D 2252/20421* (2013.01); *B01D 2252/20426* (2013.01); *B01D 2252/20484* (2013.01); *B01D 2252/20489* (2013.01); *B01D 2252/504* (2013.01); *B01D 2257/504* (2013.01); *B01D 2258/0283* (2013.01); *B01D 2258/0291* (2013.01); *Y02A 50/2342* (2018.01); *Y02C 10/04* (2013.01); *Y02C 10/06* (2013.01)

(58) Field of Classification Search
  CPC ........... B01D 2252/20426; B01D 2252/20484; B01D 2252/20489; B01D 2252/504; B01D 2257/504; B01D 2258/0283; B01D 2258/0291; B01D 53/1412; B01D 53/1475; B01D 53/346; B01D 53/62; B01D 53/78; Y02A 50/2342; Y02C 10/04; Y02C 10/06
  See application file for complete search history.

(56) References Cited

U.S. PATENT DOCUMENTS

2013/0183218 A1   7/2013  Hiwale et al.
2017/0113178 A1*  4/2017  Nakagawa ............. B01D 53/18

FOREIGN PATENT DOCUMENTS

| JP | 2013-208531 A | 10/2013 | |
| JP | 5331587 B2 | 10/2013 | |
| WO | WO-2016006416 A1 * | 1/2016 | ............. B01D 53/18 |

* cited by examiner

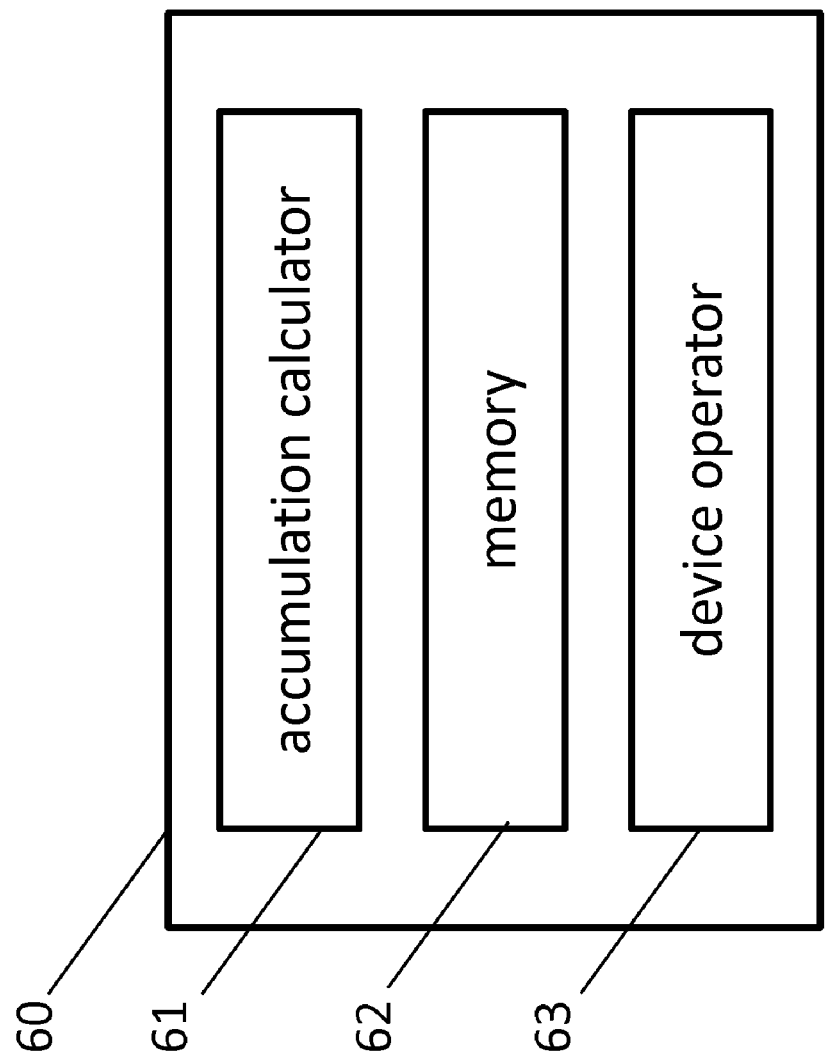

CARBON DIOXIDE SEPARATION AND CAPTURE APPARATUS AND METHOD OF CONTROLLING OPERATION OF CARBON DIOXIDE SEPARATION AND CAPTURE APPARATUS

CROSS-REFERENCE TO RELATED APPLICATION

This application is based upon and claims the benefit of priority from Japanese Patent Application No. 2015-248878, filed on Dec. 21, 2015, the entire content of which is incorporated herein by reference.

FIELD

The present invention disclosure is directed to a carbon dioxide separation and capture apparatus that captures carbon dioxide from combustion exhaust gas.

BACKGROUND

Carbon dioxide, which causes global warming is exhausted increasingly in the world. The main source of carbon dioxide is exhaust gas from thermal power plants burning fossil fuel, and carbon dioxide from thermal power plants makes up about 25% of all carbon dioxide exhaust in the world.

In recent years, as one of effective measures to suppress exhaust of carbon dioxide, particular attention is given to a carbon dioxide capture and storage technique for capturing and storing carbon dioxide gas contained in an exhaust gas. As an example of the technique, a carbon dioxide separation and capture apparatus has been considered, which causes an absorbing liquid to absorb carbon dioxide gas contained in combustion exhaust gas discharged from a thermal power plant or carbon dioxide gas contained in exhaust gas from an incineration plant or a blast furnace plant, separates the carbon dioxide gas from the exhaust gas, and captures the carbon dioxide gas.

The carbon dioxide separation and capture apparatus includes an absorption tower and a regeneration tower, for example. The absorption tower is configured to cause an absorbing liquid to absorb carbon dioxide gas contained in supplied exhaust gas and to generate a rich liquid. The regeneration tower is configured to cause the rich liquid supplied from the absorption tower to release the carbon dioxide gas and generate a lean liquid. The lean liquid generated by the regeneration tower is supplied to the absorption tower, and the rich liquid is generated from the lean liquid. A heat exchanger, installed between the absorption tower and the regeneration tower, is configured to cause thermal exchange between the rich liquid to be supplied to the regeneration tower from the absorption tower and the lean liquid to be supplied to the absorption tower from the regeneration tower. The rich liquid supplied to the regeneration tower is heated by steam generated by a reboiler and then releases the carbon dioxide gas. The carbon dioxide gas released from the rich liquid is discharged from the regeneration tower. In this manner, the carbon dioxide separation and capture apparatus separates the carbon dioxide gas from the exhaust gas and captures the carbon dioxide as disclosed in Japanese Patent Laid-open Publication No. 2013-208531.

However, the combustion exhaust gas supplied to the absorption tower may contain acid components such as nitrogen oxide or sulfur oxide. These acid components may be accumulated in the absorbing liquid, and concentration of the acid components in the absorbing liquid may increase. As a result of the accumulation of the acid components in the absorbing liquid, the absorbing liquid becomes depleted and the absorption rate of carbon dioxide in the absorption tower is decreased.

SUMMARY

Accordingly, present embodiments provide a carbon dioxide separation and capture apparatus and a method of controlling the operation of carbon dioxide separation and capture apparatus that decreases accumulation of acid components in the absorbing liquid efficiently.

In accordance with presently disclosed aspect, a carbon dioxide separation and capture apparatus includes an absorption tower configured to cause an absorbing liquid to absorb a carbon dioxide gas contained in a process gas, a regeneration tower configured to cause the absorbing liquid from the absorption tower to release the carbon dioxide gas, an inlet concentration meter configured to measure concentration of an acid component in the process gas supplied to the absorption tower, an outlet concentration meter configured to measure concentration of the acid component in the process gas discharged from the absorption tower, a supplementary absorbing liquid supply unit configured to supply a supplementary absorbing liquid to the main unit, and a controller configured to control the amount of the supplementary absorbing liquid supplied to the main unit by the supplementary absorbing liquid supply unit based on the concentration of the acid component measured at the inlet concentration meter and the outlet concentration meter.

It is to be understood that both the foregoing general description and the following detailed description are exemplary and explanatory only and are not restrictive of the embodiments, as claimed.

BRIEF DESCRIPTION OF THE DRAWINGS

The accompanying drawings, which are incorporated in and constitute a part of the specification, illustrate the embodiments and together with the description, serve to explain the principles of the embodiments.

FIG. 2 is a functional view of the controller of the carbon dioxide separation and capture apparatus.

DESCRIPTION OF THE EMBODIMENTS

Figure 1:
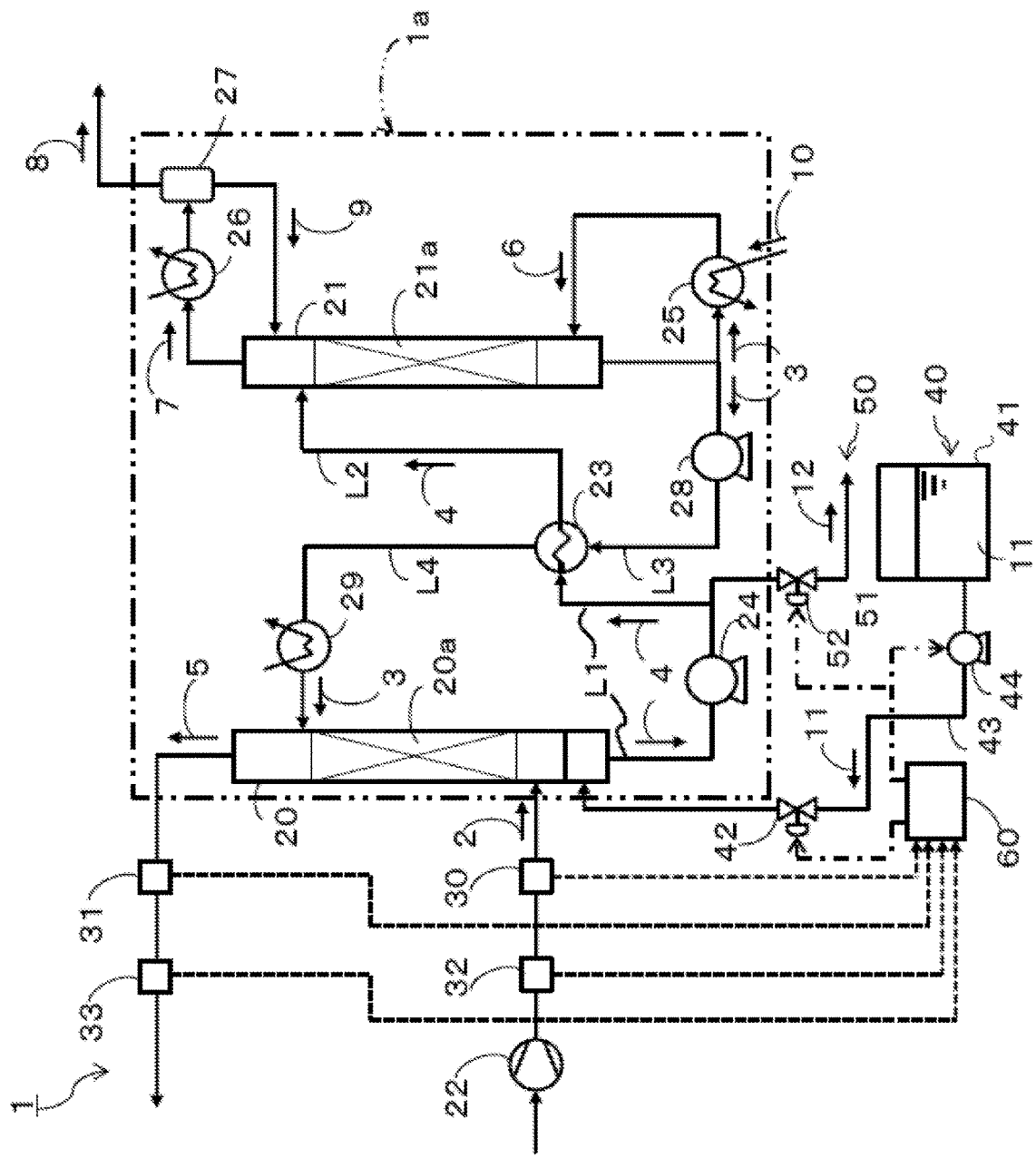
FIG. 1 is a schematic view of the carbon dioxide separation and capture apparatus.

Reference will now be made in detail to the present embodiment, an example of which is illustrated in the accompanying drawings. Wherever possible, the same reference numbers will be used throughout the drawings to refer to the same or like parts.

As illustrated in FIG. 1, a carbon dioxide separation and capture apparatus 1 has a main unit 1a that separates and captures carbon dioxide gas included in process gas 2.

The main unit 1a includes an absorption tower 20 configured to cause an absorbing liquid to absorb carbon dioxide gas contained in the process gas 2 and a regeneration tower 21 configured to cause the absorbing liquid supplied from the absorption tower 20 to release carbon dioxide gas and regenerate the absorbing liquid. The absorbing liquid circulates between the absorption tower 20 and the regeneration tower 21.

For example, the process gas 2 containing the carbon dioxide gas is discharged from an external component (installed outside the carbon dioxide separation and capture apparatus 1) such as a boiler (not illustrated) of a thermal power plant and is supplied to the absorption tower 20 by a blower 22. In addition, a lean liquid 3 (absorbing liquid containing a relatively small amount of carbon dioxide gas absorbed therein) is supplied from the regeneration tower 21 to the absorption tower 20. The absorption tower 20 causes the process gas 2 to contact the lean liquid 3, causes the lean liquid 3 to absorb the carbon dioxide gas contained in the process gas 2, and generates a rich liquid 4 (absorbing liquid containing a relatively large amount of carbon dioxide gas absorbed therein).

The absorption tower 20 may be configured as a countercurrent gas-liquid contact device. In this case, the absorption tower 20 includes a filling layer 20a. When the process gas 2 is supplied to a lower portion of the absorption tower 20 and the lean liquid 3 is supplied to an upper portion of the absorption tower 20, the lean liquid 3 flowing downward from the upper portion and the process gas 2 flowing upward from the lower portion come into contact with each other in the filling layer 20a. The generated rich liquid 4 is discharged from the lower portion of the absorption tower 20. The process gas 2 contacting the lean liquid 3 releases the carbon dioxide gas and is discharged as decarbonated gas 5 from the upper portion of the absorption tower 20.

Types of the process gas 2 supplied to the absorption tower 20 are not limited to combustion exhaust gas discharged from a boiler or process exhaust gas. The process exhaust gas from an incineration plant or a blast furnace plant could be the process gas 2. Moreover, the process gas 2 may be supplied to the absorption tower 20 after being subjected to a cooling process when necessary. In addition, for example, an amine aqueous solution such as monoethanolamine (MEA) or diethanolamine (DEA) could be used as the absorbing liquid.

A heat exchanger 23 is installed between the absorption tower 20 and the regeneration tower 21. The heat exchanger 23 and the absorption tower 20 are connected by a first rich liquid line L1. A rich liquid pump 24 is installed between the absorption tower 20 and the heat exchanger 23 at the first rich liquid line L1. The rich liquid 4 discharged from the absorption tower 20 is supplied by the rich liquid pump 24 through the heat exchanger 23 to the regeneration power 21. The heat exchanger 23 causes thermal exchange between the rich liquid 4 to be supplied to the regeneration tower 21 from the absorption tower 20 and the lean liquid 3 to be supplied to the absorption tower 20 from the regeneration tower 21. The rich liquid 4 is heated to predetermined temperature through the thermal exchange, while the lean liquid 3 serves as a heating source. In this case, the rich liquid 4, serving as a cooling source, cools the lean liquid 3 to a predetermined temperature.

The heat exchanger 23 and the regeneration tower 21 are connected by a second rich liquid line L2. The rich liquid 4 heated by the heat exchanger 23 is supplied to the absorption tower 21 via the second rich liquid line L2.

Steam 6 is supplied to the regeneration power 21 from a reboiler 25 (described later). The regeneration tower 21 causes the supplied rich liquid 4 to contact the steam 6, causes the carbon dioxide gas absorbed in the rich liquid 4 to be released from the rich liquid 4, and generates the lean liquid 3.

The regeneration tower 21 may be configured as a countercurrent gas-liquid contact device. In this case, the regeneration tower 21 includes a filling layer 21a. When the rich liquid 4 is supplied to an upper portion of the regeneration tower 21 and the steam 6 is supplied from the reboiler 25 to a lower portion of the regeneration tower 21, the rich liquid 4 flowing downward from the upper portion and the steam 6 flowing upward from the lower portion come into contact with each other in the filling layer 21a. The generated lean liquid 3 is discharged from the lower portion of the regeneration tower 21. The steam 7 which has contacted the rich liquid 4 contains carbon dioxide gas and is discharged from the upper portion of the regeneration tower 21.

The carbon dioxide separation and capture apparatus 1 illustrated in FIG. 1 further includes a gas cooler 26 and a gas-liquid separator 27. The gas cooler 26 cools and condenses steam 7 discharged from the upper portion of the regeneration tower 21 and containing carbon dioxide gas, and generates condensed water. The gas-liquid separator 27 separates the condensed water and carbon dioxide gas 8. A cooling medium such as cool water is supplied to the gas cooler 26 from external equipment, and the steam 7 containing the carbon dioxide gas is cooled by the cooling medium. At this time, the steam 7 is separated into the carbon dioxide gas 8 and condensed water 9. The carbon dioxide gas 8 separated by the gas-liquid separator 27 is compressed and stored in external equipment (not illustrated). The condensed water 9 separated by the gas-liquid separator 27 is supplied to the regeneration tower 21 and mixed with the absorbing liquid.

The aforementioned reboiler 25 is connected to the regeneration tower 21. The reboiler 25 uses the supplied heating medium 10 to heat the lean liquid 3 supplied from the regeneration tower 21 and supplies the steam 6 to the regeneration tower 21. A part of the lean liquid 3 discharged from the lower portion of the regeneration tower 21 is supplied to the reboiler 25. For example, high-temperature steam is supplied as the heating medium 10 to the reboiler 25 from an external source such as a turbine (not illustrated). The lean liquid 3 supplied to the reboiler 25 is heated after thermal exchanging with the heating medium 10. The steam 6 is consequently generated from the lean liquid 3. Specifically, in the reboiler 25, the steam 6 is generated from the lean liquid 3 by heat of high-temperature steam. The generated steam 6 is supplied to the lower portion of the regeneration tower 21.

The regeneration tower 21 and the heat exchanger 23 are connected by a first lean liquid line L3, and the lean liquid 3 is supplied to the heat exchanger 23 from the regeneration tower 21 via the first lean liquid line L3. At the first lean liquid line L3, a lean liquid pump 28 is provided. The lean liquid 3 discharged from the regeneration tower 21 is supplied to the absorption tower 20 via the heat exchanger 23 by the lean liquid pump 28. The heat exchanger cools the lean liquid 3 by thermal exchange between the rich liquid 4 supplied to the regeneration tower 21 from the absorption tower 20 and the lean liquid 3 supplied to the absorption tower 20 from the regeneration tower 21.

The heat exchanger 23 and the absorption tower 20 are connected by a second lean liquid line L4, and the lean liquid 3 cooled by the heat exchanger 23 is supplied to the absorption tower 20 via the second lean liquid line L4. At the second lean liquid line L4, a lean liquid cooler 29 could be provided. An external cooling medium such as cooling water is supplied to the lean liquid cooler 29, and the lean liquid cooler 29 further cools the lean liquid 3 cooled by the heat exchanger 23 to a defined temperature.

The lean liquid 3 cooled by the lean liquid cooler 29 is supplied to the absorption tower 20, comes into contact with the exhaust gas flowing in a direction opposite to the lean liquid 3 again, and absorbs the carbon dioxide gas contained in the process gas 2, thereby becoming the rich liquid 4. In the carbon dioxide separation and capture apparatus 1, the absorbing liquid circulates while repeatedly switching to serve as the lean liquid 3 and the rich liquid 4.

In the embodiment, as illustrated in FIG. 1, the carbon dioxide separation and capture apparatus 1 further includes an inlet concentration meter 30 and an outlet concentration meter 31. The inlet concentration meter 30 measures concentration of an acid component in the process gas 2 supplied to the absorption tower 20. The outlet concentration meter 31 measures concentration of the acid component in the decarbonated gas 5 discharged from the absorption tower 20. Measured concentrations of the acid component at the inlet concentration meter 30 and the outlet concentration meter 31 are sent to a controller 60 (explained later) as a signal. As illustrated in FIG. 1, the inlet concentration meter 30 is provided at the portion between the blower 22 and the absorption tower 20, but the inlet concentration meter 30 could be provided at another position.

In the embodiment, as illustrated in FIG. 1, the carbon dioxide separation and capture apparatus 1 further includes an inlet flow amount meter 32 and an outlet flow amount meter 33. The inlet flow amount meter 32 measures flow amount of the process gas 2 supplied to the absorption tower 20. The outlet flow amount meter 33 measures flow amount of the decarbonated gas 5 discharged from the absorption tower 20. Measured flow amounts of the process gas 2 at the inlet flow amount meter 32 and the outlet flow amount meter 33 are sent to a controller 60 (explained later) as a signal. As illustrated in FIG. 1, for example, the inlet flow amount meter 32 is provided at the portion between the blower 22 and the inlet concentration meter 30.

As shown in FIG. 1, the carbon dioxide separation and capture apparatus 1 further includes a supplementary absorbing liquid supply unit 40 and an absorbing liquid discharging unit 50. The supplementary absorbing liquid supply unit 40 supplies the absorbing liquid to the main unit 1*a*, and the absorbing liquid discharging unit 50 discharges the absorbing liquid from the main unit 1*a*.

The supplementary absorbing liquid supply unit 40 may include a supply tank 41 storing supplementary absorbing liquid 11, and a supply bulb 42 controlling the amount of the supplementary absorbing liquid 11 supplied to the main unit 1*a* from the supply tank 41. The supply tank 41 preferably stores fresh absorbing liquid as the supplementary absorbing liquid 11. Therefore, by supplying the supplementary absorbing liquid 11, the concentration of the acid component in the lean liquid 3 and the rich liquid 4 is easily decreased. The supply bulb 42 is opened when the supplementary absorbing liquid 11 is supplied to the main unit 1*a*, and the supply bulb 42 is closed when the supplementary absorbing liquid 11 is not supplied.

The supplementary absorbing liquid supply unit 40 preferably supplies the supplementary absorbing liquid 11 to at least one of the absorption tower 20 and the first rich liquid line L1. In this embodiment, the supplementary absorbing liquid supply unit 40 supplies the supplementary absorbing liquid 11 to the absorption tower 20. Therefore, the supply tank 41 is connected to the absorption tower 20 by a supply line 43. The supply bulb 42 is provided at the supply line 43.

Especially, the supply line 43 is preferably connected to the lower portion of the absorption tower 20. By this component, the supplementary absorbing liquid 11 is supplied to the lower portion of the absorption tower 20, and the supplementary absorbing liquid 11 is included into the rich liquid 4 stored in the lower portion of the absorption tower 20. Therefore, changes in the liquid level of the rich liquid 4 are suppressed, and the measuring accuracy of a liquid level meter (provided at lower portion of absorption tower 20, not shown) is improved.

At the supply line 43, a supply pump 44 could be also provided. The supply pump 44 supplies the supplementary absorbing liquid 11 to the absorption tower 20 to from the supply tank 41.

The absorbing liquid discharging unit 50 could include a discharge line 51 and a discharge bulb 52. The discharge line 51 discharges the absorbing liquid as discharged liquid 12 from the main unit 1*a*. And the discharge bulb 52 is provided at the discharge line 51, and opens when the absorbing liquid is discharged and closes when the absorbing liquid is not discharged.

The absorbing liquid discharging unit 50 preferably discharges the absorbing liquid from a position where the temperature of the absorbing liquid is lower, such as the absorption tower 20 and the first rich liquid line L1. In this embodiment, the absorbing liquid discharging unit 50 discharges the absorbing liquid from the portion between the rich liquid pump 24 and the heat exchanger 23. Therefore, the discharge line 51 is connected to the portion between the rich liquid pump 24 and the heat exchanger 23 at the first rich line L1. By these compositions, the rich liquid 4 could be discharged as the discharged liquid 12 by using the power of the rich liquid pump 24.

The supplementary absorbing liquid supply unit 40 and the absorbing liquid discharging unit 50 are controlled by the controller 60.

The controller 60 controls the amount of the supplementary absorbing liquid 11 supplied to the main unit 1*a* based on the concentration of an acid component measured at the inlet concentration meter 30 and the outlet concentration meter 31.

As shown in FIG. 2, the controller 60 includes an accumulation calculator 61, a memory 62 and a device operator 63.

The controller 60 includes at least a processor, such as a Central Processing Unit (CPU) and the memory 62. The controller 60 is configured to control certain functions of the carbon dioxide separation and to monitor and decrease accumulation of the acid component in the absorbing liquid according to an embodiment of the invention.

In this situation, a computer program (hereinafter, "program") for executing various types of processes performed by the controller 60 is provided as being incorporated, in advance, in a ROM, the memory 62, or other storage. The program may be provided as being recorded on a computer-readable storage medium such as a Compact Disk Read-Only Memory (CD-ROM), a Flexible Disk (FD), a Compact Disk Readable (CD-R), or a Digital Versatile Disk (DVD). Further, the program may be provided or distributed by being stored in a computer connected to a network such as the Internet and downloaded via the network. For example, the program is structured with modules including the accumulation calculator 61 and the device operator 63. As actual hardware, the CPU of the controller 60 is configured to read and execute the program, thereby embodying the functional modules of the accumulation calculator 61 and the device operator 63, as described below.

The accumulation calculator 61 calculates the amount of the acid component included in the process gas 2 by using the concentration of the acid component in the process gas 2 and the flow amount of the process gas 2. The accumulation calculator 61 calculates the amount of the acid component included in the decarbonated gas 5 by using the concentration of the acid component in the decarbonated gas 5 and the flow amount of the decarbonated gas 5. The accumulation calculator 61 further calculates the amount of the acid component included in the rich liquid 4 by using the difference between the amount of the acid component included in the process gas 2 and the amount of the acid component included in the decarbonated gas 5. Finally, the accumulation calculator 61 further calculates an accumulation amount of the acid component included in the rich liquid 4 by integrating the amount of the acid component included in the rich liquid 4 over a defined period.

The memory 62 stores information about the relationship between the accumulation amount of the acid component included in the rich liquid 4 and the supply amount of the supplementary absorbing liquid 11 [example, range?]. Especially, the supply amount of the supplementary absorbing liquid 11 is defined when the accumulated amount of the acid component included in the rich liquid 4 reaches a defined value [example, range]. Here, the supply amount of the supplementary absorbing liquid 11 could be defined as a portion of the whole amount of the lean liquid 3 and the rich liquid 4. In other words, the supply amount of the supplementary absorbing liquid 11 could be set equal to or less than the whole amount of the lean liquid 3 and rich liquid 4.

The device operator 63 supplies the supplementary absorbing liquid 11 by operating the supply bulb 42 and the supply pump 44 of the supplementary absorbing liquid supply unit 40. The device operator 63 adjusts the supply amount of the supplementary absorbing liquid 11 by using the accumulation amount of the acid component calculated at the accumulation calculator 61 and the defined relationship between the accumulated amount of the acid component and the supply amount of the supplementary absorbing liquid 11 stored in the memory 62.

For example, when the calculated accumulation amount of the acid component reaches a defined value, the device operator 63 sends a signal to the supply bulb 42 and the supply pump 44 so that the supply bulb 42 opens and the supply pump 44 operates. By this process, the supplementary absorbing liquid 11 is supplied to the absorption tower 20 from the supplementary absorbing liquid supply unit 40. To supply a defined amount of the supplementary absorbing liquid 11, the supply bulb 42 is opened for a defined period.

The device operator 63 discharges the absorbing liquid by operating the discharge bulb 52. The device operator 63 adjusts the amount of discharged liquid 12 based on the supply amount of the supplementary absorbing liquid 11. For example, the device operator 63 sends a signal to the discharge bulb 52 so that the rich liquid 4 is discharged from the first rich liquid line L1. The amount of discharged rich liquid 4 is adjusted by opening the discharge bulb 52 for a defined period.

The amount of discharged liquid 12 is preferably set as the same amount of the supplementary absorbing liquid 11 supplied to the absorption tower 20. By this process, there is no change in the whole amount of absorbing liquid in the main unit 1a before and after supplementary absorbing liquid 11 is supplied. However, as long as the concentration of the acid component is decreased efficiently, the amount of discharged liquid 12 is not limited to the same amount as the supplied supplementary absorbing liquid 11.

The device operator 63 could supply the supplementary absorbing liquid 11 and discharge the discharged liquid 12 at an arbitrary timing. For example, the supplementary absorbing liquid 11 could be supplied after the rich liquid 4 is discharged. In this case, the rich liquid 4 containing a high concentration of the acid component could be discharged before the supplementary absorbing liquid 11 is supplied, and the acid component is efficiently decreased in the lean liquid 3 and the rich liquid 4 in the main unit 1a.

During operation of the carbon dioxide separation and capture apparatus 1, the concentration of the acid component in the process gas 2 and the flow amount of the process gas 2 supplied to the absorption tower 20 and the concentration of the acid component in the decarbonated gas 5 and the flow amount of the decarbonated gas 5 discharged from the absorption tower 20 are measured sequentially. The supplementary absorbing liquid 11 is supplied to the main unit 1a based on the accumulation amount of the acid component included in the rich liquid 4.

The accumulation calculator 61 calculates the amount of the acid component included in the process gas 2 by using the concentration of the acid component in the process gas 2 and the flow amount of the process gas 2. The accumulation calculator 61 calculates the amount of the acid component included in the decarbonated gas 5 by using the concentration of the acid component in the decarbonated gas 5 and the flow amount of the decarbonated gas 5. The accumulation calculator 61 further calculates the amount of the acid component included in the rich liquid 4 by using the difference between the amount of the acid component included in the process gas 2 and the amount of the acid component included in the decarbonated gas 5. Finally, the accumulation calculator 61 further calculates the accumulation amount of the acid component included in the rich liquid 4 by integrating the amount of the acid component included in the rich liquid 4 over a defined period.

When the accumulation amount of the acid component in the rich liquid 4 reaches a defined value [example, range?], the rich liquid 4 is discharged from the main unit 1a as discharged liquid 12. After that, the supplementary absorbing liquid 11 in the supply tank 41 is supplied to the main unit 1a.

When the rich liquid 4 is discharged, the discharge bulb 52 is opened for a defined period [example, range?]. By this, the rich liquid 4 is discharged as the discharged liquid 12 from the first rich line L1. When the discharge amount of the rich liquid 4 reaches a defined value stored at the memory 62 [example, range?], the discharge bulb 52 is closed. The period that the discharge bulb 52 is opened could be adjusted so that the amount of rich liquid 4 discharged is the same as the amount of the supplementary absorbing liquid 11 supplied.

After finishing discharging the rich liquid 4 by closing the discharge bulb 52, the supply bulb 42 of the supplementary absorbing liquid supply unit 40 is opened by the device operator 63, and the supplementary absorbing liquid 11 in the supply tank 41 is supplied to the main unit 1a. When the supply amount of the supplementary absorbing liquid 11 reaches a defined value [example, range?], the supply bulb 42 is closed. The period that the supply bulb 42 opens is adjusted so that the supply amount of the supplementary absorbing liquid 11 reaches a defined value stored in the memory 62[example, range?]. By these processes, the supplied amount of the supplementary absorbing liquid 11 is the same as the amount of discharged liquid 12, and the amount of the acid component in the lean liquid 3 and rich liquid 4 in the main unit 1a is decreased.

Here, the concentration of the acid component in the process gas 2 could be changed by plant conditions, such as the adjustment of power, changing of the power generation load, or changing the way of operating the boiler in a thermal power plant. By changing the concentration of the acid component in the process gas 2, the accumulation concentration of the acid component is also changed.

In this embodiment, the accumulation amount of the acid component in the rich liquid 4 is calculated automatically and sequentially. Thus, even in the case that the concentration of the acid component in the process gas 2 changes frequently, the amount of the acid component accumulated in the rich liquid 4 is measured accurately, and accuracy of the supply amount of the supplementary absorbing liquid 11 supplied to the main unit 1a is improved.

In this embodiment, the supplementary absorbing liquid 11 is supplied to the main unit 1a based on the concentrations of the acid component in and the flow amounts of the process gas 2 and the decarbonated gas 5. By this process, the amount of the acid component in the rich liquid 4 is monitored accurately. Therefore, the accumulation amount of the acid component in the rich liquid 4 is calculated accurately, and the supplementary absorbing liquid 11 is supplied to the main unit 1a based on the accumulation amount of the acid component in the rich liquid 4. By this process, the acid component in the lean liquid 3 and rich liquid 4 in the main unit 1a are decreased efficiently. As a result, deterioration of the absorbing liquid in the main unit 1a is suppressed, and the decreasing of carbon capture performance is also suppressed.

In this embodiment, the supply amount of the supplementary absorbing liquid 11 is adjusted by the supply bulb 42. By this composition, the supply amount of the supplementary absorbing liquid 11 is adjusted easily.

In this embodiment, the rich liquid 4 containing a large acid component is discharged by the discharge unit 50. By this composition, the rich liquid 4 containing a large acid component is discharged from the main unit 1a, and the acid component in the lean liquid 3 and rich liquid 4 in the main unit 1a is decreased efficiently. Furthermore, the discharge amount of the rich liquid 4 is easily controlled by the discharge bulb 52.

In this embodiment, the rich liquid 4 is discharged from the portion between the rich liquid pump 24 and the heat exchanger 23 at the first rich line L1. The temperature of the absorbing liquid at this portion is lower than in other portions of the carbon dioxide separation and capture apparatus 1. In the result, the discharged liquid 12 is easily manipulated (such as carried, stored), and a decrease of heat efficiency of the main unit 1a is suppressed. Furthermore, the rich liquid 4 is discharged by power of the rich liquid pump 24, and an external power source to discharge the rich liquid 4 is not necessary.

The case that the supplementary absorbing liquid 11 is supplied to the absorption tower 20 is explained above. Instead of this composition, the supplementary absorbing liquid 11 could be supplied to the first rich line L1. In this case, by supplying the supplementary absorbing liquid 11 to a low temperature portion of the first rich line L1, as opposed to another portion of the first rich line L1, a decrease of heat efficiency of the main unit 1a is suppressed. Furthermore, as long as a decrease of heat efficiency of the main unit 1a is suppressed, the supplementary absorbing liquid 11 could be supplied to other portions of the main unit 1a, such as the heat exchanger 23, or the portion between the regeneration tower 21 and the exchanger 23.

In this embodiment, the supplementary absorbing liquid 11 is supplied to the main unit 1a after the rich liquid 4 is discharged from the main unit 1a. Instead of this case, as long as the concentration of the acid component is decreased efficiently, supplying the supplementary absorbing liquid 11 and discharging the rich liquid 4 could be performed at arbitrary timing.

In this embodiment, the absorbing liquid discharging unit 50 discharges the absorbing liquid from the main unit 1a. Instead of this case, as long as the concentration of the acid component is decreased efficiently and the total amount of lean liquid 3 and rich liquid 4 do not exceed a defined value, the absorbing liquid does not need to be discharged.

What is claimed is:

1. A carbon dioxide separation and capture apparatus comprising:
    a main unit including
        an absorption tower configured to cause an absorbing liquid to absorb a carbon dioxide gas contained in a process gas; and
        a regeneration tower configured to cause the absorbing liquid from the absorption tower to release the carbon dioxide gas;
    an inlet concentration meter configured to measure a concentration of an acid component in the process gas supplied to the absorption tower;
    an outlet concentration meter configured to measure a concentration of the acid component in a decarbonated gas discharged from the absorption tower;
    a supplementary absorbing liquid supply mechanism including a supply line configured to supply a supplementary absorbing liquid to the main unit; and
    a controller configured to control an amount of the supplementary absorbing liquid supplied to the main unit from the supplementary absorbing liquid supply mechanism based on the concentration of the acid component measured at the inlet concentration meter and the outlet concentration meter, wherein
    the main unit includes a rich liquid line supplying the absorbing liquid from the absorption tower to the regeneration tower and a lean liquid line supplying the absorbing liquid from the regeneration tower to the absorption tower,
    the supplementary absorbing liquid supply mechanism includes a supply tank configured to store the supplementary absorbing liquid, the supply tank being separate from the regeneration tower, and
    the supply line is separate from the lean liquid line.

2. The carbon dioxide separation and capture apparatus according to claim 1,
    further comprising;
    an inlet flow amount meter configured to measure a flow amount of the process gas supplied to the absorption tower;
    an outlet flow amount meter configured to measure a flow amount of the decarbonated gas discharged from the absorption tower, and
    wherein the controller controls the amount of the supplementary absorbing liquid supplied to the main unit from the supplementary absorbing liquid supply mechanism based on the concentration of the acid component measured at the inlet concentration meter and the outlet concentration meter, the flow amount of the process gas measured at the inlet flow amount meter, and the flow amount of the decarbonated gas measured at the outlet flow amount meter.

3. The carbon dioxide separation and capture apparatus according to claim 1,
    wherein the supplementary absorbing liquid supply mechanism includes
    a supply bulb configured to control the amount of the supplementary absorbing liquid supplied to the main unit, and wherein the controller controls the amount of the supplementary absorbing liquid supplied to the main unit by operating the supply bulb.

4. The carbon dioxide separation and capture apparatus according to claim 1,
wherein the supplementary absorbing liquid supply mechanism supplies the supplementary absorbing liquid to the absorption tower.

5. The carbon dioxide separation and capture apparatus according to claim 1,
further comprising;
a heat exchanger provided between the absorption tower and the regeneration tower, and the heat exchanger configured to cause heat exchange between the absorbing liquid supplied to the absorption tower from the regeneration tower and the absorbing liquid supplied to the regeneration tower from the absorption tower,
wherein the rich liquid line includes an absorbing liquid line configured to supply the absorbing liquid to the heat exchanger from the absorption tower, and
wherein the supplementary absorbing liquid supply mechanism supplies the supplementary absorbing liquid to at least one of the absorption tower and the absorbing liquid line.

6. The carbon dioxide separation and capture apparatus according to claim 1,
further comprising:
an absorbing liquid discharging mechanism including a discharge line configured to discharge the absorbing liquid from the main unit, and
wherein the controller controls an amount of the absorbing liquid discharged by the absorbing liquid discharging mechanism based on the amount of the supplementary absorbing liquid supplied by the supplementary absorbing liquid supply mechanism.

7. The carbon dioxide separation and capture apparatus according to claim 6,
wherein the absorbing liquid discharging mechanism includes a discharge bulb, and
wherein the controller controls the amount of the absorbing liquid discharged from the main unit by operating the discharge bulb.

8. The carbon dioxide separation and capture apparatus according to claim 6,
wherein the main unit further includes:
a heat exchanger provided between the absorption tower and the regeneration tower, and the heat exchanger configured to cause heat exchange between the absorbing liquid supplied to the absorption tower from the regeneration tower and the absorbing liquid supplied to the regeneration tower from the absorption tower,
wherein the rich liquid line includes an absorbing liquid line configured to supply the absorbing liquid to the heat exchanger from the absorption tower, and
wherein the absorbing liquid discharging mechanism discharges the absorbing liquid from at least one of the absorption tower and the absorbing liquid line.

9. The carbon dioxide separation and capture apparatus according to claim 8,
further comprising:
an absorbing liquid pump provided at the absorbing liquid line, and
wherein the absorbing liquid discharging mechanism discharges the absorbing liquid from a portion between the absorbing liquid pump and the heat exchanger.

10. The carbon dioxide separation and capture apparatus according to claim 1,
wherein the controller controls the amount of the supplementary absorbing liquid supplied to the main unit such that a concentration of the acid component in the absorbing liquid is lower than or equal to a predetermined threshold.

* * * * *